May 19, 1959   D. E. WILLIS   2,887,201
CLUTCHING MECHANISM FOR FRONT AXLE DRIVE FOR AUTOMOTIVE VEHICLES
Filed May 11, 1953   2 Sheets-Sheet 1
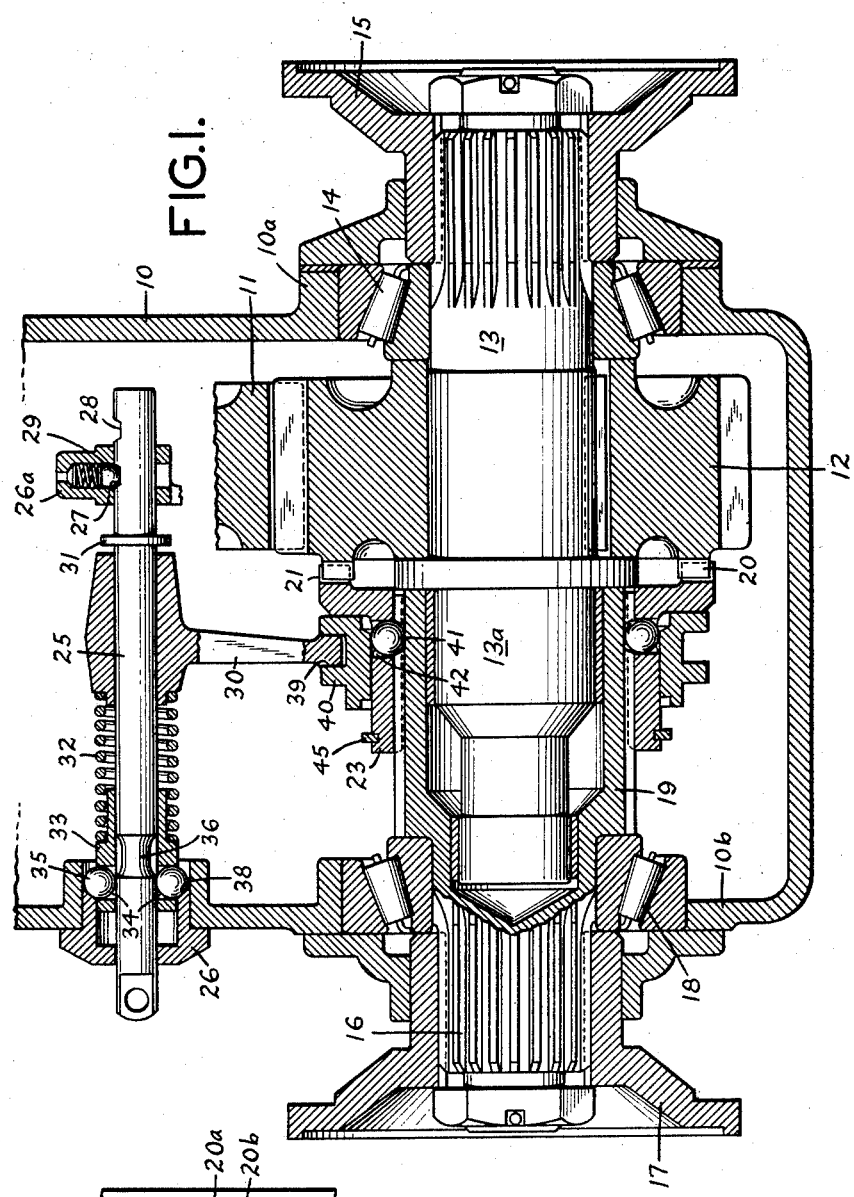
INVENTOR.
DELBERT ELWOOD WILLIS
BY
HIS ATTORNEYS.

May 19, 1959  D. E. WILLIS  2,887,201
CLUTCHING MECHANISM FOR FRONT AXLE DRIVE FOR AUTOMOTIVE VEHICLES
Filed May 11, 1953  2 Sheets-Sheet 2
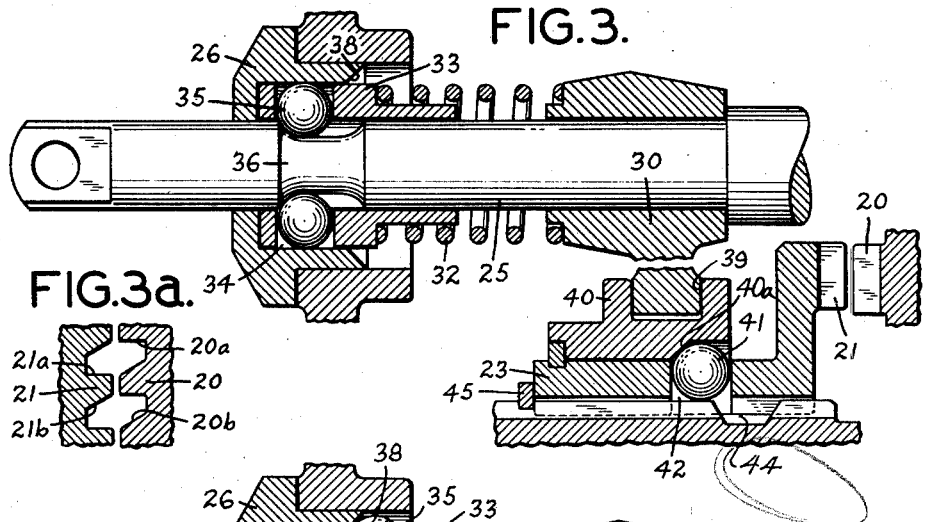
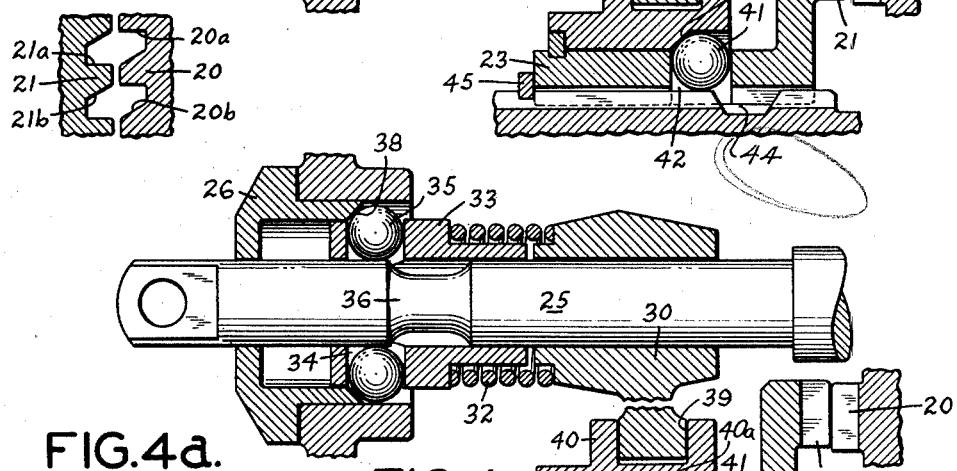
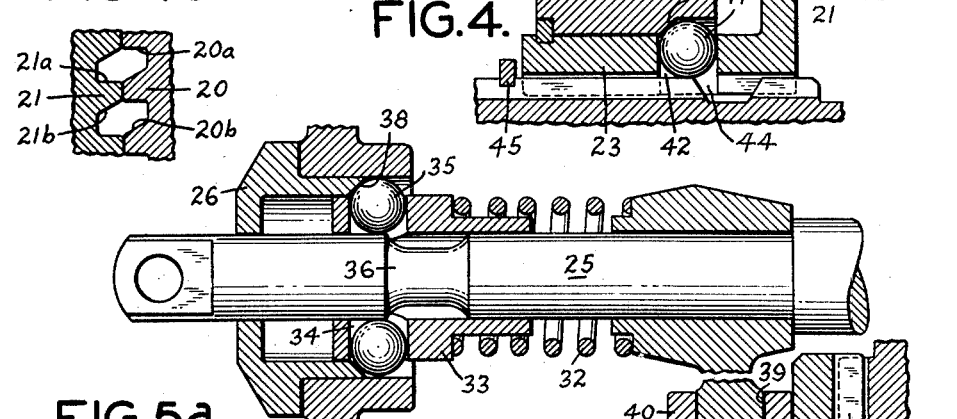
INVENTOR.
DELBERT ELWOOD WILLIS
BY
HIS ATTORNEYS.

United States Patent Office 2,887,201
Patented May 19, 1959

2,887,201

CLUTCHING MECHANISM FOR FRONT AXLE DRIVE FOR AUTOMOTIVE VEHICLES

Delbert Elwood Willis, New Brunswick, N.J., assignor, by mesne assignments, to Mack Trucks, Inc., a corporation of New York Application May 11, 1953, Serial No. 354,351

8 Claims. (Cl. 192—67)

This invention relates to clutch mechanisms for vehicle transmissions and the like and it relates particularly to a clutch mechanism for coupling a front wheel drive of a multi-axle drive vehicle to the transmission and engine of the vehicle.

Most of the multi-axle drive types of vehicles are designed so that the front axle does not have to be used to drive the vehicle unless the rear wheels lose traction. The front axle drive, accordingly, is used only in emergencies and is not required a large proportion of the driving time. For this reason, it is apparent that it is desirable to hold the cost of the equipment for driving the front axle to a minimum and the design of the equipment should be simple and not be subject to needless wear or use substantial amounts of power during the periods when it is not needed.

The simplest, most rugged and least expensive mechanism for providing an emergency front axle drive is a manually shifted jaw or tooth-type clutch which positively connects the front axle or front wheel drive to the transmission. While such a clutch is the best from the standpoint of low initial cost, operating economies and simplicity, it has not been as successful as might be desired and is not popular with the drivers because it is difficult to use. The reason that the simple jaw type clutch is difficult to operate in a front axle drive system is that the front and rear wheels are geared to the ground by tire friction. When the vehicle moves, the front and rear drive shafts rotate substantially in unison. Inasmuch as the clutch members connected to the front shaft and the rear shaft or transmission also rotate in unison, they cannot engage unless the teeth of one clutch member are in alignment with the spaces of the other clutch member. Such alignment of tooth and tooth spaces is a relatively rare occurrence. As a result, unless compensation is made in the drive mechanism to provide for alignment, the driver may not be able to engage the clutch at all.

The usual practice to bring the clutching members into proper alignment is to use a different ratio between the front and rear axles and the clutch members so that they will rotate at slightly different speeds. Inasmuch as a difference in axle ratio causes scuffing of the tires when the clutch members are engaged or locked, the ratio difference is usually very small and the number of times that the clutch members are aligned for engagement is limited to about once for every 50 feet of travel of the vehicle. Even with this provision for alignment of the clutch members, the driver frequently is forced to maintain a shifting effort on the clutch during the time required for the vehicle to travel a very substantial distance, often times nearly 50 feet. Because this requires the driver to maintain a constant shifting pressure usually under difficult driving conditions, he may abuse the transmission by trying to jam the clutches together with excessive force or ultimately he may not use the front axle drive at all.

Jaw clutches of the type having the abovementioned ratio differential are about as difficult to disengage as they are to engage. The ratio difference in the front and rear drives tends to wind up the gear train between them and this produces a high pressure between the teeth of the clutch members which in turn creates high frictional forces that make it very difficult, if not impossible, at times, to disengage the clutch manually. When the clutch jams in the engaged position, the driver may try to disengage the clutch by the use of excessive force and may damage the shift lever or other parts of the device. Alternatively, he may drive the vehicle for long periods of time under normal conditions with the front drive engaged, thereby wearing out tires and causing excessive wear on the front drive.

The present invention overcomes the above-mentioned disadvantages of the positive lock-up type of jaw clutch mechanism by providing means whereby the clutch can be engaged or disengaged by an easy push or pull operation. Advantage is taken of the normal operation of the clutch itself to facilitate the engagement and disengagement of the clutch and thereby greatly improve the ease of operation and reduce the danger of abuse and damage to the clutch.

For a better understanding of the present invention, reference will be had to the accompanying drawings, in which:

Fig. 1 is a view in section taken through a portion of a transmission housing and a clutch mechanism mounted therein for connecting the transmission to the front and rear drive axles of a multiple axle drive vehicle;

Fig. 2 is a development of the clutch teeth of the clutch illustrating the shape of the teeth;

Figs. 3, 4 and 5 are views in section of a portion of the clutching mechanism illustrating the various steps in moving the clutch from a disengaged position to an engaged position; and Figs. 3a to 5a are schematic views of the clutch teeth illustrating the positions of the teeth corresponding to the positions of the clutch elements in the corresponding Figs. 3 to 5, respectively.

For purposes of illustration, a clutching mechanism of the type embodying the present invention is shown as mounted in a portion of a transmission housing 10 of a vehicle (not shown) and coupled with the transmission by means of one of the transmission gears 11. The transmission gear 11 drives a gear 12 which is fixed to a shaft 13. The shaft is rotatably mounted in a suitable bearing 14 in a wall 10a of the housing and carries at its right-hand end a coupling flange 15 for connecting the shaft 13 to the rear wheels or rear axle of the vehicle (not shown). The rear axle is coupled at all times to the transmission gear 11.

The front axle or wheels of the vehicle are connected to a shaft 16 by means of a coupling flange 17 thereon. The shaft 16 is mounted in a bearing 18 in a wall 10b of the casing 10 and has an enlarged hollow section 19 which rotatably and telescopically receives an extension 13a on the shaft 13 so that the two shafts 13 and 16 are in alignment and relatively rotatable.

The gear 12, as illustrated, or a separate element fixed with relation to the gear 12, may be provided with a toothed clutch member 20 for cooperation with another toothed clutch member 21 carried by a sleeve 23 which is mounted on the hollow shaft extension 19 for sliding movement axially thereof. The sleeve 23 is splined to the shaft portion 19 and held against rotation relatively thereto.

The clutch sleeve 23 is moved by means of a shifter rail 25 which is slidably mounted in a bushing 26 fixed in one wall of the housing 10 and a guide member 26a also supported by the housing. The shifter rail 25 is adapted to be moved by a simple push-pull lever or hand member (not shown) mounted conveniently in the driver's compartment. The inner end of the shifter rail 25 is provided with a pair of recesses 27 and 28 for cooperation with a spring urged ball member 29 carried in the guide member 26a to releasably retain the shifter rail in either of two positions.

As shown in Fig. 2, the clutch member 20 and the clutch member 21 have teeth of unsymmetrical shape. The front faces 20a and 21a of the clutch teeth (in the driving direction of the front wheel) are substantially perpendicular to the plane of rotation of the clutch members. The rear edges 20b and 21b of the teeth are inclined in such a direction that when the vehicle is coasting, the difference in ratio between the front wheels and the back wheels will cause the faces 20b to tend to overrun the faces 21b thereby producing an axial component of force. In other words, the clutch elements 20 and 21 and the shafts 13 and 16 are arranged to rotate at different speeds to cause the inclined surfaces of the teeth to urge the clutches to unclutched or disengaged position.

In order to engage and disengage the clutch members 20 and 21, the shifter rail 25 is provided with a shifter finger 30 which is slidable lengthwise of the shifter rail. It is restrained in its movement towards the right by means of a collar 31 fixed to the shifter rail. The finger 30 is normally biased towards the collar 31 by means of a coiled spring 32. The coiled spring 32 bears against the left-hand end of the shifter finger and against the right-hand end of a sleeve 33 which is slidably mounted on the shifter rail 25 and also slidably received within the bushing 26. The sleeve 33 has a plurality of radial openings 34 therein to receive a corresponding number of balls 35 which are of greater diameter than the thickness of the sleeve 33. The shifter rail has a peripheral groove 36 which can be moved into alignment with the balls, as shown in Fig. 3, so that the balls may be retracted therein to allow the sleeve 33 to move telescopically into the bushing 26. The inner end of the bushing 26 is provided with beveled edges 38 for a purpose to be described.

If the shifter rail 25 is pushed to the right from the position shown in Fig. 3, the sleeve 33, the spring 32 and the shifter finger 30 will also be moved to the right. If the shifter finger 30 encounters resistance, the spring 32 will resist movement of the sleeve 33 to the right and continued movement of the shifter rail will compress the spring 32 and cause the balls 35 to move outward radially thereby unlocking the rail 25 from the sleeve 33 as shown in Fig. 4. The shifter rail 25 can move to its extreme right-hand position in which the ball 29 engages in the notch 27 (Fig. 1).

Pressure stored in the spring 32 can be used to maintain shifting pressure to cause engagement of the clutch teeth 20 and 21 in a way now to be described. The lower end of the shifter finger engages in a groove 39 in a collar 40 which is slidably mounted on the sleeve 23. The collar cooperates with a series of balls 41 which are mounted in radial openings 42 near the mid-portion of the sleeve 23. The balls 41 are of greater diameter than the thickness of the sleeve 23 so that the collar 40 bears against balls 41 and can move the sleeve 23 to the right by engagement with the balls 41. Pressure exerted on the shifter finger 30 by the spring 32 will be transmitted by the collar 40 and the balls 41 to the sleeve 23 to urge the latter toward the right.

If the teeth on clutch member 20 should be in alignment with the tooth spaces of the clutch member 21, the clutch members will engage as shown in Fig. 5a and the front and rear axles will be coupled together. Usually however, the teeth are in about the relation shown in Fig. 3a so that they come into end-to-end engagement, as shown in Fig. 4a, and prevent further movement of the sleeve 23 to the right. Inasmuch as the clutch members are coupled to the front and rear drives with such ratio differences that they rotate at slightly different speeds, they ultimately will come into proper alignment for clutching engagement, as shown in Fig. 5a. When alignment occurs, spring will force the sleeve 23 to the right causing the clutch members 20 and 21 to engage. The sleeeve 23 is moved far enough by the spring 32 so that the balls 41 will be disposed in the radial plane of notches or a groove 44 formed in the shaft portion 19 by cutting away portions of the splines. The collar 40 has an inclined edge 40a which bears against the balls 41 and forces them inwardly into the notches or groove 44. The collar 40 is moved by the spring 32 past the balls and against the back of the clutch element 21, as shown in Fig. 5. In this position the balls 41 cannot move outwardly because the collar 40 covers them and the balls 41 lock the clutch member 21 against movement to the left. Therefore, the normal tendency of the clutch teeth to disengage due to the inclination of the edges 20b and 21b of the teeth and the different ratios of the front and rear axles will be blocked by the locking action of the balls 41 and the collar 40.

In order to disengage the clutch, it is only necessary to move the shifter rail to the left. Under these circumstances, when the collar 31 comes up against the right-hand end of the shifter finger 30, it will move the collar 40 up against the stop ring 45 on the sleeve 23 and will uncover the outer ends of the openings 42 so that the balls 41 are free to move out of the notches or groove 44 thereby freeing the clutch members 20 and 21 for disengagement. Continued movement of the shifter rail 25 to the left will disengage the clutch members 20 and 21. Disengagement of the clutch members is aided by the action of the inclined sides 20b and 21b of the clutch teeth.

It will be appreciated that very little effort will be required on the part of the operator to disengage the clutch because the clutch itself aids in such disengagement.

Some friction due to pressure of the balls 41 against the inside of the collar 40 must be overcome. The balls are pressed outwardly against the collar because of the inclination of the sides of the groove 44 and the normal tendency of the clutch elements to be forced apart. The frictional resistance can be kept small by keeping the inclination of the walls of the groove 44 and the edges 20b and 21b of the teeth small.

During movement of the shifter rail towards the left, all of the elements including the sleeve 33 and the balls 35 carried thereby will be reestablished in the position shown in Fig. 3. The beveled edge 38 of the sleeve will act to force the balls 35 into the groove 36 to enable the sleeve 33 to move into the bushing 26, thereby substantially unloading the spring 32.

It will be seen from the preceding description that in order to engage the clutch, the driver merely pushes the shifter rail 25 to the right thereby compressing the spring 32. Thereafter, the spring 32 will act through the collar 40 and the balls 41 to cause engagement of the clutch and locking of the clutch in engagement.

Disengagement of the clutch is equally easy because it is only necessary to move the shifter rail to the left. Only enough power is required to compress the spring 32 enough to couple the sleeve 33 to the shifter rail by means of the balls 35 during the return movement of the shifter rail.

It will be understood that while the invention is particularly useful for driving the front axle or wheels of a multi-axle vehicle, it may be used in many other fields wherein power must be divided between two driving elements or where emergency power must be supplied to two independently driven shafts. Therefore, the form of the invention described herein should be considered as illustrative and not as limiting the scope of the following claims.

I claim:

1. A clutch mechanism comprising a drive member, a driven member, cooperating relatively movable, engageable and disengageable clutch elements on said drive and driven members, said clutch elements having inclined surfaces thereon tending to disengage said clutch elements in response to a driving force when said clutch elements are engaged, a movable shifting member for engaging and disengaging said clutch elements, locking means actuated by said movable shifting member for locking said clutch elements in engagement and opposing disengagement of said clutch elements and means connected to said movable shifting member and movable in one direction for applying a biasing pressure to said movable shifting member for urging said clutch elements into engagement, the last-mentioned means including locking means for maintaining said biasing pressure at least until said clutch elements are engaged.

2. A clutch for connecting and disconnecting two elements normally rotatable at slightly different speeds, comprising a pair of cooperating clutch members connected to said elements and movable relative to each other to engage and disengage, a shifter member for moving said clutch members relatively, a manually movable member, means responsive to movement of said manually movable member in one direction to apply a biasing pressure to said shifter member to urge said clutch members into engagement, means to maintain said biasing pressure at least until said clutch members engage, means responsive to said biasing pressure and movement of said clutch members into engagement to lock them in engagement, means actuated by movement of said shifter member in another direction for unlocking said locking means to release the clutch members and releasing said shifter member of said biasing pressure, and means responsive to the different speeds of said elements for urging said clutch members apart.

3. A clutch mechanism comprising a pair of cooperating toothed clutch members movable into and out of clutching engagement, a manually operable shifter rail, spring means energized by movement of said manually operable shifter rail in one direction to produce biasing pressure urging said clutch members into clutching engagement, and means responsive to further movement of said manually operable shifter rail in said one direction to release it from said spring means and maintain said spring energized at least until said clutch members are engaged.

4. A clutch mechanism comprising a pair of cooperating toothed clutch members movable into and out of clutching engagement, a manually movable shifter member, motion-transmitting means releasably connected with and interposed between said manually movable shifter member and said clutch members and including spring means, said spring means being energized by movement of said manually movable shifter member in one direction to apply a biasing pressure to urge said clutch members into engagement, and means responsive to further movement of said manually movable shifter member to release said manually movable shifter member from said motion-transmitting means and maintain said spring energized at least until said clutch members engage.

5. The clutch mechanism set forth in claim 4, in which said motion transmitting means is responsive to movement of said manually movable shifter member in the direction opposite to said one direction to release said locking means, said clutch members having teeth with inclined surfaces thereon normally urging said clutch elements out of engagement when they are engaged and rotating.

6. A clutch mechanism comprising a pair of clutch members having positive clutch elements thereon, the clutch elements of one of said clutch members being movable into and out of engagement with the clutch elements of the other, a movable shifter member, motion-transmitting means including spring means interposed between and connecting said one clutch member and said movable shifter member, said spring means being energized by said movable shifter member upon movement of the latter in one direction to apply pressure to said one clutch member urging it into clutching engagement, said spring means being released from said movable shifter member and locked in energized condition upon further movement of said movable shifter member in said one direction to maintain said pressure on said one clutch element to engage the clutch elements of said clutch members when they move into clutching alignment.

7. A clutch mechanism for front and rear wheel drive vehicles having engine-driven front and rear axles, comprising a first toothed clutch element connected to and rotatable with said front axle, a second engine-driven toothed clutch element connected to and rotatable with said rear axle, said clutch elements being shiftable relative to each other into and out of positive clutching engagement, inclined surfaces in said clutch elements normally urging them out of engagement in response to driving forces on said clutch elements, a slidable sleeve movable relative to and with one of said clutch elements, coupling means interposed between said sleeve and said one of said clutch elements for moving the latter in response to movement of said sleeve, locking means actuated by movement of said sleeve and said one of said clutch elements into engagement with the other for locking said one of said clutch elements against movement to disengaged position by said inclined surfaces, a shifter member engaging said sleeve, manually operated shifting means for said shifter member and spring means interposed between said manually operated shifting means and said shifter member and energized by actuation of said manually operated shifting means in one direction to apply a biasing pressure on the shifter member urging said clutch elements into engagement, means responsive to actuation of said manually-operated shifting means in said one direction for releasing it from said spring means and maintaining said biasing pressure on said shifter member at least until they engage and actuate said locking means to lock said clutch elements in engagement, said manually operated shifting means being movable in another direction to unlock said locking means and relieve said shifter member of said biasing pressure and to disengage said clutch elements with the aid of said inclined surfaces.

8. A clutch mechanism comprising a drive member, a driven member, cooperating relatively movable, engageable and disengageable clutch elements on said drive and driven members, said clutch elements having inclined surfaces thereon tending to disengage said clutch elements in response to a driving force when said clutch elements are engaged, a movable shifting member for engaging and disengaging said clutch elements, locking means actuated by said shifting member for locking said clutch elements in engagement and unlocking said clutch elements to enable them to disengage, a manually movable member, resilient means interposed between said manually movable member and said shifting member and responsive to movement of said manually movable member in one direction for applying a biasing pressure to said shifting member to urge said clutch elements into engagement, and means responsive to movement of said manually movable member farther in said one direction for releasing said manually movable member from said resilient means and locking the latter in pressure-applying condition.

References Cited in the file of this patent

UNITED STATES PATENTS

| | | |
|---|---|---|
| 1,462,879 | Woodward | July 24, 1923 |
| 1,704,433 | Harris | Mar. 5, 1929 |
| 2,388,763 | Randol | Nov. 13, 1945 |
| 2,398,570 | Wildhaber | Apr. 16, 1946 |
| 2,639,013 | Meschia | May 19, 1953 |
| 2,735,528 | Dodge | Feb. 21, 1956 |

FOREIGN PATENTS

| | | |
|---|---|---|
| 86,613 | Switzerland | May 19, 1919 |